No. 884,192. PATENTED APR. 7, 1908.
W. O. McCAIN.
TRAP DOOR.
APPLICATION FILED NOV. 6, 1907.

2 SHEETS—SHEET 2.

Witnesses
F. C. Gibson.
R. M. Smith.

Inventor
William O. McCain.

By Victor J. Evans
Attorney

UNITED STATES PATENT OFFICE.

WILLIAM O. McCAIN, OF MATHISTON, MISSISSIPPI, ASSIGNOR OF ONE-HALF TO JOSEPH B. ATKINS, OF MATHISTON, MISSISSIPPI.

TRAP-DOOR.

No. 884,192.　　　　Specification of Letters Patent.　　　　Patented April 7, 1908.

Application filed November 6, 1907. Serial No. 400,979.

*To all whom it may concern:*

Be it known that I, WILLIAM O. McCAIN, a citizen of the United States, residing at Mathiston, in the county of Webster and State of Mississippi, have invented new and useful Improvements in Trap - Doors, of which the following is a specification.

This invention relates to trap doors, and the object of the invention is to provide a trap door for use in banks and other places where money is kept in considerable quantities, the trap door being designed to be located at the point where a person is forced to stand while obtaining money from the cashier, the construction of the trap door and the operative parts connected therewith being such that in case a robber attempts to hold up the cashier, the latter, by means of his foot may trip or release the trap door, causing the same to give way beneath the robber and precipitate to the cellar or space beneath the floor, the mechanism also including an auxiliary door which is automatically moved into the place previously occupied by the main trap door, thereby holding the robber a prisoner in the room beneath.

With the above general object in view, the invention consists in the novel construction, combination and arrangement of parts hereinafter fully described, illustrated and claimed.

Figure 1:
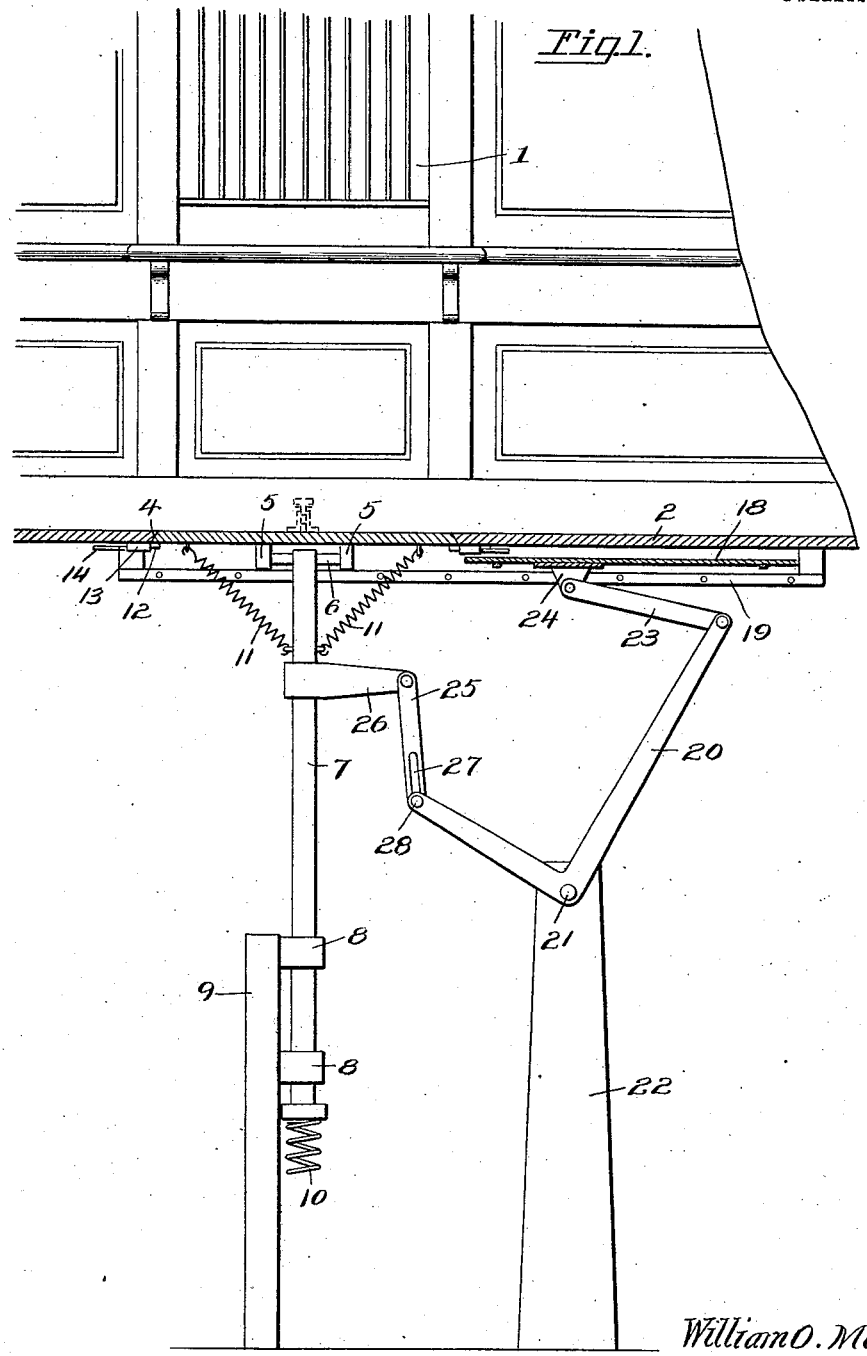
Figure 2:
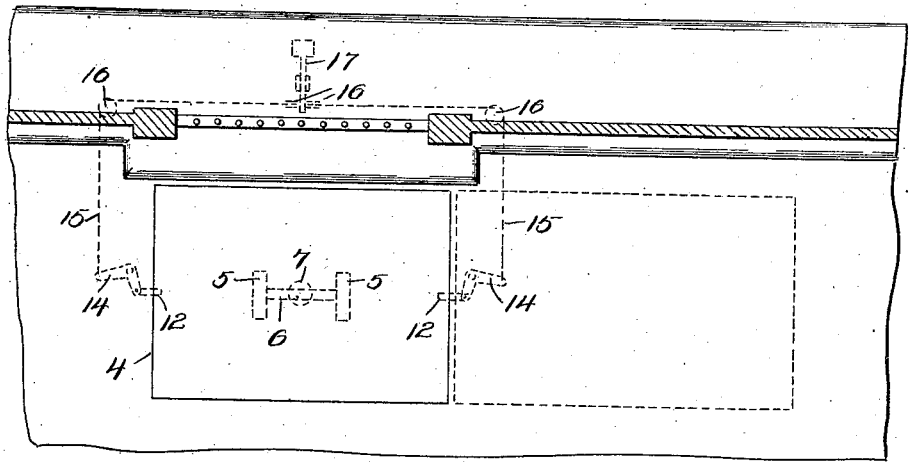
Figure 4:
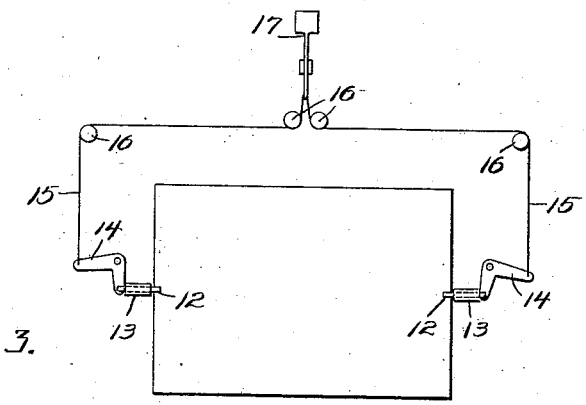
Figure 3:
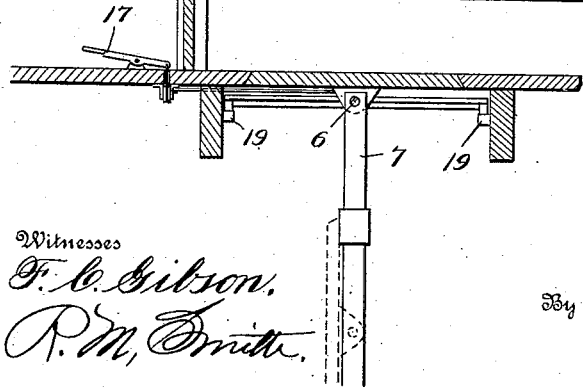

In the accompanying drawings, Figure 1 is a sectional elevation of the trap door and the operating mechanism therefor embodying said invention. Fig. 2 is a sectional plan view of the same. Fig. 3 is a vertical transverse section taken at right angles to Fig. 1. Fig. 4 is a diagrammatic plan view of the trap door and the locking and releasing mechanism therefor.

In the drawings, I have represented a bank window 1, 2 designating the floor in front of the window, and 3 a trap door located directly in front of the window and having a beveled or dove-tailed joint or seat with the floor, as indicated at 4 so that when the trap door is pushed upward against the beveled seat 4, the upper surface of said door lies exactly flush with the main body of the floor, the further upward movement of the trap door is prevented, and it is securely held from tilting to an uneven position relatively to the floor.

The door 3 is provided on its underside with bearing lugs 5 which receive a crosshead 6 carried by the upper end of a standard 7 which passes through guides 8 on a supporting post 9 in the cellar or room beneath the floor 2, the standard 7 carrying at its lower end a bumper or cushion spring 10 which will cushion the downward movement of the standard 7 when it strikes against the floor beneath the same. By reason of the connection described between the standard 7 and the door 3, when the trap door moves downward it tilts to a vertical position as indicated by dotted lines in Fig. 3 and the occupant of the trap door is thus precipitated to the room beneath. One or more springs 11 may be interposed between the standard 7 and the door 3 to assist in the tilting movement of the door and to insure such tilting movement.

The trap door is locked in its normal position shown in Figs. 1 and 3 by means of latch bolts 12 slidably mounted in suitable bearings 13 secured to the fixed section of the floor, the bolts being operatively connected with bell crank levers 14 from which flexible connections 15 extend around guide pulleys 16 to a trip 17 which is shown as consisting of a foot lever arranged in convenient position to be operated by the cashier who by pressing his foot on the lever may instantly withdraw the bolts 12 and release the trap door.

Mounted at one side of the door space normally occupied by the door 3, is an auxiliary door 18 mounted to slide horizontally beneath the floor 2 and upon suitable supporting guides or rails 19 located at opposite sides of the door opening. The sliding door 18 is operated by means of an elbow lever 20 fulcrumed at 21 on a suitable support 22, one arm of said lever being connected by a link 23 to a lug 24 on the underside of the door 18 while the other arm of said lever is connected by a slotted link 25 to an arm 26 fast on the standard 7. The link 25 is provided with a longitudinal slot 27 in which slides the pivot 28 by which said link is connected to the elbow lever 20. It will now be seen that the standard 7 will move downward a certain distance without rocking the elbow lever 20, thereby allowing the person on the trap door to be precipitated into the room beneath. Then in the further movement of the standard 7, the link 25 acts on the elbow lever, rocking the latter and causing it through the medium of the link 23 to slide the auxiliary door 18 across the space previously occupied by the door 3, thus closing the trap door space or opening.

Having thus fully described the invention, what is claimed as new is:—

1. The combination with a sliding standard, of a trap door forming a movable section of a floor and having a jointed and folding connection with the said standard, supporting means for holding the trap door in line with the floor, and means for withdrawing the door support.

2. The combination with a trap door forming a section of a floor, and means for supporting said door in the same plane with the floor, of means for withdrawing the door support to release the door, and a movable standard for guiding the movement of the door away from the door opening, said door being hinged to the standard.

3. The combination with a movable trap door forming a section of a floor, of means for supporting said trap door in the plane of the floor, means for withdrawing the door support to release the door, a movable standard to which the trap door is hinged, guiding means for said standard, and a bumper or cushion for said standard.

4. The combination with a movable trap door forming a section of a floor, of means for supporting said trap door in the plane of the floor, means for withdrawing the door support to release said door, a sliding standard upon which the door is pivotally mounted and one or more springs interposed between the standard and door, operating to tilt the door on the standard as the door moves downward.

5. The combination with a movable trap door forming a section of a floor, a sliding standard on which the door is pivotally mounted and supporting means for said door, of means for withdrawing the door support to release the door, an auxiliary door, and lever connections between the standard and auxiliary door whereby as the trap door moves downward the auxiliary door is moved into position to close the opening occupied by the trap door.

In testimony whereof I affix my signature in presence of two witnesses.

WILLIAM O. McCAIN.

Witnesses:
   OBIE E. McCLAIN,
   MELVIN E. SMITH.